United States Patent [19]

Neumann

[11] 3,839,129

[45] Oct. 1, 1974

[54] REFLECTIVE FOIL AND PROCESS

[75] Inventor: Hubert G. Neumann, New York, N.Y.

[73] Assignee: Pictorial Productions, Inc., Mt. Vernon, N.Y.

[22] Filed: July 19, 1973

[21] Appl. No.: 380,681

Related U.S. Application Data

[63] Continuation-in-part of Ser. No. 75,371, Sept. 25, 1970, abandoned, and a continuation of Ser. No. 145,631, May 21, 1971, abandoned.

[52] U.S. Cl.......................... 161/4, 161/5, 161/213, 264/135, 264/247
[51] Int. Cl.............................................. B44f 1/02
[58] Field of Search .................. 161/4, 5, 213, 214; 264/247, 135

[56] References Cited
UNITED STATES PATENTS

| | | | |
|---|---|---|---|
| 3,246,066 | 4/1966 | Gits.................................... | 264/132 |
| 3,421,967 | 1/1969 | Hochner................................. | 161/5 |
| 3,681,180 | 8/1972 | Kent..................................... | 161/5 |

*Primary Examiner*—William E. Schulz
*Attorney, Agent, or Firm*—Lerner, David, Littenberg & Samuel

[57] ABSTRACT

Reflective surfaces are imparted to molded objects by use of improved foils. A preferred structure comprises a substrate, a metal layer, and a protective film or coating over the metal layer. The substrate layer is preferably a film of material which is identical with or compatible to the substance used to mold the article or ware. The protective film is preferably a heat and scuff resistant material such as a 25 to 150 gauge polyester film. The metal layer, or metal surface is preferably a vacuum metallized surface and may be deposited either upon the substrate film or upon the protective film.

13 Claims, 7 Drawing Figures

PATENTED OCT 1 1974 3,839,129
SHEET 1 OF 2
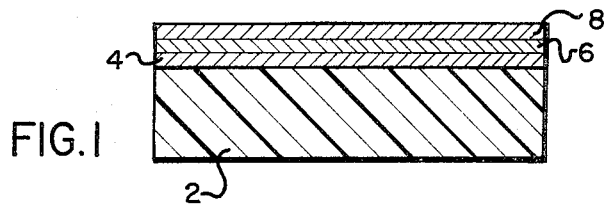
FIG.1
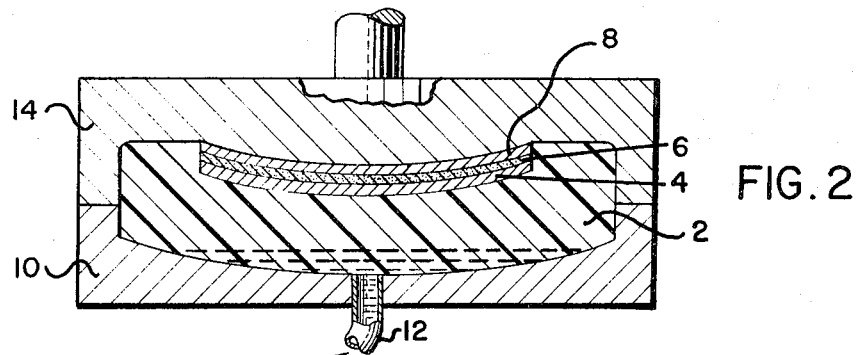
FIG.2
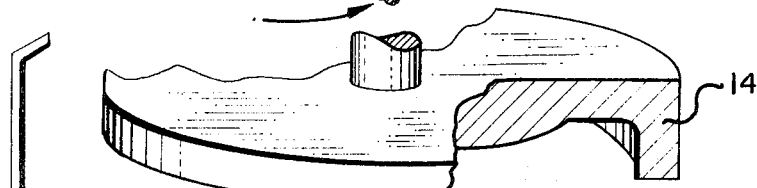
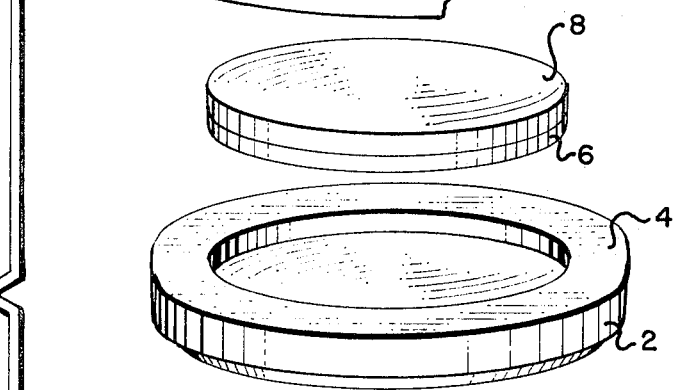
FIG.3
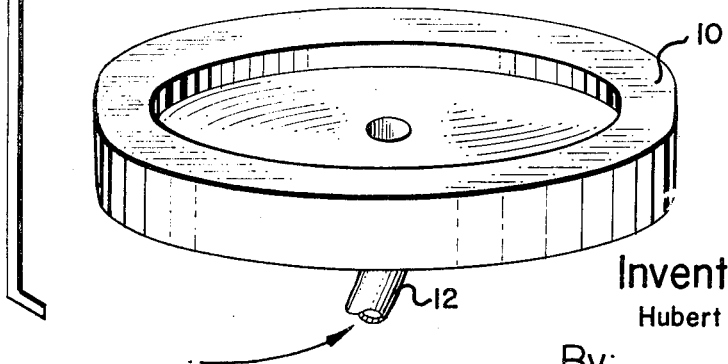
Inventor:
Hubert G. Neuman
By: March and LeFever
Attorneys:

Inventor:
Hubert G. Neuman

By: March and LeFever

Attorneys:

REFLECTIVE FOIL AND PROCESS

This application is a continuation-in-part of U.S. Ser. No. 75,371 filed Sept. 25, 1970 for the same inventor and a continuation of application Ser. No. 145,631 filed May 21, 1971, and both now abandoned.

BACKGROUND OF THE INVENTION

This invention relates to plastic articles which contain decorations thereon as a permanent or integral part thereof and to methods of preparation of such articles. Particularly the invention relates to methods of preparing plastic articles which have metallic reflective surfaces associated therewith.

Plastic has become increasingly important in recent years in a number of fields. Particularly important has become the substitution of plastic products for china and tableware and a growing industry has developed in this area. The art of decorating plastic ware, both thermoplastic and thermosetting ware is rapidly developing. It is to the thermoplastic segment of this industry that this invention is directed.

The use of plastic materials to form ware is about equally divided between thermoplastic and thermosetting manufacturing procedures. In the field of thermoplastic resins techniques for injection molding have been developed and form a substantial part of the economically available plastic products.

In injection molding, a mold cavity is prepared and a thermoplastic material is injected into the cavity under pressure, the formed article allowed to cool slightly, the mold is opened, and the article removed in its practically finished form. Decorative designs, lettering, and other such indicia, are normally placed in the mold cavity prior to the injection of the liquid plastic and thus becomes securely affixed to the molded article. Solid articles are ordinarily manufactured by injection molding and articles with a hollow core or center such as flasks, bottles and the like are blow molded.

It has been the practice in the art of decorating molded articles to prepare a strip of film or other plastic material with the design or decoration in the form of a printed layer thereon which is commonly referred to in the art as a "foil." Various techniques for the preparation of these foils have been described in the patent literature as, for example, U.S. Pat. No. 3,122,598, issued Jan. 14, 1969, and U.S. application Ser. No. 26,532 filed Apr. 8, 1970 for the instant inventor.

The foil which is presently manufactured for use in decorating plastic articles has not been completely satisfactory for several reasons. One of the problems involved is the tendency for the formation of "blisters" during the molding process, that is, the tendency for portions of the design to fail to adhere tightly to the surface of the ware. It is postulated that this blistering tendency is caused by any of a number of chemical and physical reactions taking place during the high temperature molding operation such as the generation and release of gases due to the reactions in the resin, and the like.

Another common problem with the molding foils of the prior art is the tendency of the ink of the design layer to melt and flow with the hot plastic entering the mold cavity at the mold "gate," since the hot injected plastic material sometimes will melt the foil and carry the ink along with it. This tendency has made it necessary to use a design which is blank at the point of the mold opposite the gate and was therefore limiting with respect to the type of design which could be used.

The prior art foils have also been found to be deficient in that design printing could not be extended to the foil edges since the inks used in the designs are incompatible with the usual resins used for molding and a considerable "overlap" of the covering protective film was necessary to insure good edge adhesion. This overlap of protective film caused the formation of a "halo effect" and an unevenness in the outer surface of the ware which has resulted in a general unaesthetic appearance.

A wide variety of plastic products are made with reflective surfaces, such as mirrors, reflectors and the like. With presently available techniques this is accomplished by either an expensive, unsatisfactory and inefficient metallizing step wherein the surface to be made reflective is metallized by spraying, coating, plating, vacuum metallizing or the like or by the expensive and time-consuming procedure of fastening a separately prepared and fitted metallic or glass mirror to the molded item as desire.

DESCRIPTION OF THE INVENTION

In accordance with the present invention there is provided a new and improved reflective in-mold molding foil useful for imparting a metallic reflective surface to injection molded articles. The foil comprises, at least, a metallic reflective layer and a substrate. Preferably the metallic reflective layer is protected by a protective layer superimposed thereover.

The substrate for the foil must be compatible with the material from which the molded article is made. By the term "compatible" is meant the capacity of two entities, here the substrate and the material from which the article is made, to combine and remain together without undesirable separation and without harmful effect to the foil construction.

Examples of suitable substrate materials include those self-supporting plastic films or coatings of materials which are identical with, or which relate closely to the material of the article. Other suitable substrates include cloatings of heat activated or pressure sensitive adhesive systems, rubber based adhesive systems, and the like. It has also been found that substrates of scrim, cloth, certain paper materials, flocs, etc., are operable in certain instances.

The protective layer is preferably a coating or a self-supporting film. A preferred film is a polyester resin film of a gauge of between about 25 and 500. When the substrate is in the form of a self-supporting film, it may be from about 0.5 to about 20 mils. in thickness.

Particularly, the substrate can be a film or coating of any of the thermoplastic materials which are commonly known in the art of either clear, translucent or opaque material. For example, the substrate may be a film formed from the acrylic resins, linear polyamides such as nylon resins, polyallomer materials, polyethylenes, polypropylenes, ABS resins, styreneacrylonitrile copolymers, polystyrene resins, impact polystyrenes containing rubbers, either natural or synthetic, polycarbonates, vinyl resins, methyl methacrylates, various types of plastic papers, or any compatible mixture thereof.

When a protective material is used to cover the reflective surface, it should have a high degree of light transmission and a high degree of surface gloss on both surfaces. This material may be any of the commonly known polymers of the condensation reaction of ethylene glycol and terephthalic acid, as for example, the duPont product "Mylar," (Registered Trademark of duPont) or it may be the polyethylene terephthlate type such as the product from the 3M Company, "Scotchpak" or "Scotchpar" (Registered Trademarks of 3M) or the Celanese Corporation product "Celanar" (Registered Trademark of Celanese). Film such as the Type 0 Melinex Polyester film available from Imperial Chemicals Industries may also be used. This film has little haze, and its optical refractive index should be close to that of glass.

The protective layer may be a polyester film laminated over the reflective surface when the latter is deposited on the top surface of the substrate. This lamination, or any lamination used to construct the foils of this invention, may be accomplished by using any of the known lamination systems used to build structured films. Examples include heat activated adhesive systems, pressure laminating systems, either cold or hot, ultrasonic welding systems, heat planishing systems, extrusion laminations, and the like. Polyester adhesives may be used as well as adhesive systems employing vinyl ester copolymers, e.g., vinyl chloride, vinyl acetate, etc.

Although polyester materials are preferably used as the protective agent, films of other materials which must be clear or translucent, such as films formed from acrylic resins, styrene-acrylonitrile copolymers, polyvinyl-chloride, polyethylene, polypropylene, polystyrene, acetates, polycarbonates, poly-sulfones, cellulose acetate butyrate and the like, may be used.

The preferred embodiment of this invention comprises a reflective or mirror-like molding foil wherein the reflective surface is "sandwiched" between a foil substrate and a protective film. It is to be understood, however, that many different structures may be constructed, and many different techniques may be used for preparing the improved reflective foil of this invention.

The foils of the invention may be constructed or designed to fit their particular end uses, and a wide variation is possible. It is preferred, however, that the reflective surface, or "mirror" portion of the foil be formed by the deposition of a metallic layer by any suitable means on any of the polyester films as described above. Known methods for accomplishing this are by vacuum metallization, hot stamping techniques, and the like, with vacuum metallization being preferred.

The vacuum metallizing technique is well-known in the plastic art and is described in detail on pages 1040–1042 of Modern Plastics Encyclopedia — 1968 edition, Vol. 45 No. 1A (Sept., 1967). Briefly stated, the technique involves the deposition of a very thin film of metal on a substrate by evaporation of the metal under high vacuum conditions in a sealed chamber.

In the process, the pressure in the metallizing chamber is reduced to approximately 0.5 micron and the metal to be deposited is heated by electrically energized filaments and brought to its melting point. A further increase in power causes the molten metal to vaporize and the vapor condenses on the surface to be coated leaving a resulting film of practically monomolecular thickness. Variations in the metallization techniques and varying amounts of metallic deposits will result in different degrees of light transmission and reflection. For example, a thin metallic layer will permit more light transmission and two-way mirrors could be made using a transparent plastic for the molded article.

It is also contemplated that the reflective surface may be a self-supporting metallic foil such as tin foil, aluminum foil, gold foil or the like. In this instance the laminate is made by adhering the foil with the adhesive system chosen to the substrate. In the case of a triple laminate a protective coating may be laminated over the top of the metal foil.

With films as defined above of a thickness ranging from about 0.25 to about 20 mils, that is, self-supporting structures, the foils of the invention may also be formed utilizing a coating techniques, as is known in the art, to form one layer.

Using laminating techniques with the above described adhesive systems, when required, coating techniques known to the art, with the term "metal" indicating a metal layer, such as deposited by vacuum metalization technique, or a self-supported metal foil, and with the term "substrate" used as defined above, following is a chart of some of the structures of the improved reflective molding foils of the invention: (the top of the structure being the direction of viewing of the foil):

CONSTRUCTION CHART

| | | |
|---|---|---|
| 1. metal<br>substrate | 8. film<br>metal<br>film<br>substrate | 14. coating<br>film<br>metal<br>substrate |
| 2. metal<br>film<br>substrate | 9. film<br>metal<br>coating<br>substrate | 15. coating<br>film<br>metal<br>coating<br>substrate |
| 3. metal<br>coating<br>substrate | 10. film<br>coating<br>metal<br>substrate | 16. coating<br>coating<br>metal<br>substrate |
| 4. coating<br>metal<br>substrate | 11. film<br>coating<br>metal<br>film<br>substrate | 17. film<br>film<br>metal<br>substrate |
| 5. coating<br>metal<br>film<br>substrate | 12. film<br>coating<br>metal<br>coating<br>substrate | 18. film<br>metal<br>metal<br>substrate |
| 6. coating<br>metal<br>coating<br>substrate | 13. coating<br>film<br>metal<br>substrate | 19. coating<br>metal<br>metal<br>substrate |
| 7. film<br>metal<br>substrate | | |

To create special effects, such as a foil having an advertising message or a decorative design, to allow only certain areas to be reflective, etc., the foils according to the structures set out above may contain a printing layer deposited on the finished foil or upon any layer prior to final assembly of the foil. This print layer may be formed by any of the techniques known to the art such as silk screen, rotogravure, letter press, lithography, flexography, etc.

Two such foils would have the construction

| | |
|---|---|
| print | film |
| film | print |
| metal | metal |
| substrate | substrate |

The improved molding foil of this invention is placed in the mold cavity with the substrate in position to be contacted with the hot plastic entering the mold cavity. If desired a solvent adhesive may be applied to the foil when in place, although this is usually not required. When the mold is filled the substrate forms an integral part of the molded article.

The improved mirror or reflective foil of this invention is also receptive to decorative enhancement. For example it is receptive to hot stamping processes, either before or after the molding step. Its flexibility enables the decorator to use embossing techniques, either of the foil prior to use or by means of embossing engraved in the molds, both being reproduced with high fidelity in the mirror surface after the molding step.

The flexibility of the foils is also important in that a wide range of optical properties may be achieved by engineering specific curvatures in the mold. During the molding the foil conforms to these curvatures and the resultant molded mirror can have magnifying or reducing properties or even both in the same plane.

Its character also alows it to be cut into various complex shapes to give specific effects.

The use of the protective film which forms a protective cover for the metallic surace has the additive advantage, however, particularly when a polyester material is used, of being more scuff and scratch resistant than the article itself.

With the improved reflective molding foil it is also possible to decorate the molded article opposite the gate or point of injection of the melted plastic without discoloration or distortion.

It is also contemplated that the improved reflective foils of this invention may be prepared using the "extrusion" lamination technique. In this instance it is preferred that the metallic layer be affixed to the protective film and the substrate extruded in a sheet upon the metal just prior to a pair of pressure rollers which form the laminate by heat and compression. However, the metallic reflective surface may be affixed to the substrate and the protective film extruded thereupon, also. It is understood, of course, that the metallic reflective surface may be a vacuum metallized deposition or an adhesively secured metallic foil.

The invention will be further explained by reference to the drawings in which

FIG. 1 represents a cross-sectional view of a portion of a completed article or ware with one embodiment of an improved reflective molding foil of the invention in place;

FIG. 2 represents a cross-sectional view of a mold in position containing the article or ware and the foil in place;

FIG. 3 is an expanded view of FIG. 2; and

Figure 4:
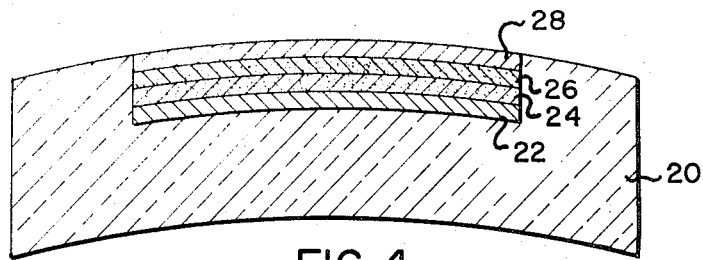
FIGS. 4-7 are cross-sectional views of other embodiments of the inventive concept.

Turning now to the drawings reference numeral 2 represents a portion of a plastic article or ware. Superimposed thereon, and forming an integral part thereof is a foil substrate layer represented by reference numeral 4. Reference numeral 6 indicates a metallized reflective surface. This surface has been either deposited upon the top of substrate layer 4 or on the bottom of layer 8. Layer 8 protects the metal layer 6 from abrasion.

Reference numeral 10 represents the lower part of a typical mold having an injection gate 12 and an upper half 14. The improved foil of this invention, i.e., layers 4, 6 and 8, are placed in the mold cavity and layer 4 becomes an integral part of the article 2 when hot plastic is injected through gate 12 into the mold cavity.

The process hereinabove described makes it possible to provide excellent specular reflective surfaces to plastic objects, surfaces which approach the quality of the best grade of glass mirrors. The quality afforded is largely due to the very thin optically clear extremely smooth protective layer — that is, the closeness of the reflective surface to impinging light rays so that little if any distortion is present. Too, the extreme high pressures exerted upon the foil during the molding process and the high degree of accuracy obtained with mold surfaces removes or eliminates small imperfections which result in distortion or infidelity of reflection.

Mirrors having excellent optical properties have been achieved by the use of mold surfaces made of glass at a point which corresponds to the reflective surface. The use of a glass surface imparts an extremely smooth surface to the mirrored section of the molded part. The glass area could be in the form of a glass insert in the mold corresponding to the mirror area and could be a permanent part of the mold. The insert could be ground and polished to various optical curvatures deemed desirable by known techniques.

Another utilitarian feature of the inventive concept is that if the molded article is to be of a clear or translucent plastic material, its qualities of light transmission may be such that the reflective surface may be used to reflect light through the plastic body of the molded article per se.

For example, mirrors, light reflectors, such as fixtures for overhead lights, such as fluorescent lights, flashlight reflectors, and the like may be molded of a clear plastic material using a reflective foil of this invention. In this embodiment, the laminar layers may be, from the top of the foil:

film    coating
metal   metal and the like.

In these instances, the substrate, the film or coating which is identical with or compatible with the material from which the article is being molded, is superimposed over the top of the reflective surface and the light reflection occurs through the molded article and the substrate.

In this embodiment the reflective surface may be of a self-supporting metallic foil, or it may be formed by vacuum metallizing the under surface of the substrate.

As was briefly stated above the reflective foils of this invention make it possible to construct a wide variety of very interesting mirrors or objects having reflective surfaces.

Magnifying or reducing mirrors — convex or concave surfaces — one-way or "see through" mirrors and the like may be prepared using the foils of this invention.

A number of very interesting and unique mirrors may be prepared using optical grade acrylic resin materials which are currently available and which mold into objects which have properties approaching those of optical glass. The properties of light collection and light bending of this material, combined with a "double" reflective foil constructed, for example, two separate reflective foils placed back to back and laminated together, enable the molding of a wide range of mirrors or mirror objects.

Figure 5:
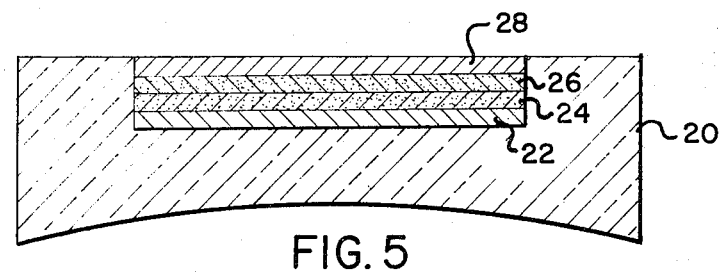
Figure 6:
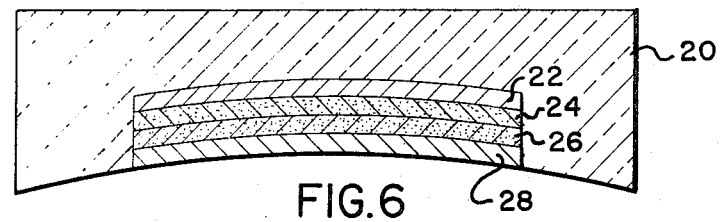
Figure 7:
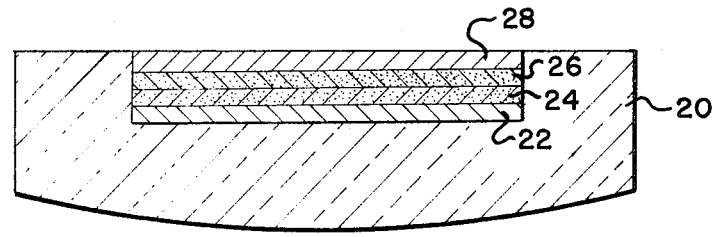

In FIGS. 4–7, four examples of such mirrors are given. In all the examples shown reference numeral 20 indicates a mirror base which has been molded from an optical grade acrylic resin. The foils used in these FIGS. have the construction:

substrate
metal
metal
polyester

Two foils are prepared with the construction substrate-metal and metal-polyester, respectively, and laminated together with the metal surfaces back to back. The substrate, in these examples, is a film of the same acrylic resin from which the body of the mirror is molded. Thus, in FIGS. 4–7, reference numeral 22 indicates the foil substrate, 24 and 26 the metal layer, and numeral 28 the protective layer.

Due to the unique optical properties of the optical properties of the optical grade acrylic resin and the double reflective foil construction, viewing from the top of FIGS. 4–7 respectively, gives a reduced image, a normal image, a reduced image and a normal image. When viewed from the bottom, and in the same order, the image is enlarged, enlarged, enlarged, and reduced, respectively.

To summarize briefly, the instant invention relates to an improved process for imparting reflective surfaces to molded articles utilizing a reflective molding foil. The foils comprise a reflective metal layer which is preferably sandwiched between two laminar layers. In the preferred embodiment of the invention the foil comprises a substrate material which is identical to or compatible with the material from which a molded article is made, a reflective surface, and a film or coating over the reflective surface.

What is claimed is:

1. An injection molded thermoplastic article comprising an integral mirror surface, said mirror surface comprising a smooth foil; said foil comprising a substrate layer made integral with said article during injection molding of said aritcle, a smooth and clear protective layer bonded to said substrate layer, and a smooth and bright metallized layer disposed between said protective layer and said substrate layer; said protective layer and said bright metallized layer having been so smoothed during injection molding of the article that they cooperate to specularly reflect visible light thereby providing said mirror surface.

2. The article in accordance with claim 1 wherein said substrate layer comprises a preformed, self-supporting film.

3. The article in accordance with claim 2 wherein said metallized layer is deposited on said substrate layer.

4. The article in accordance with claim 3 wherein said protective layer is a coating.

5. The article in accordance with claim 3 wherein said protective layer is a preformed, self-supporting film.

6. The article in accordance with claim 1 wherein said protective layer is a preformed, self-supporting film.

7. The article in accordance with claim 6 wherein said metallized layer is deposited on said protective layer.

8. The article in accordance with claim 7 wherein said substrate layer comprises an adhesive coating.

9. The article in accordance with claim 1 wherein said substrate layer comprises a preformed, self-supporting film, and including a layer of adhesive for bonding said substrate to said metallized layer and protective layer.

10. The article in accordance with claim 1 wherein said substrate layer is a polystyrene.

11. The article in accordance with claim 1 wherein said protective layer is a polyethylene terephthalate or a polyester.

12. The article in accordance with claim 1 wherein said substrate layer is of a material identical to thermoplastic material employed in said thermoplastic article.

13. The article in accordance with claim 1 wherein said substrate layer is of a material compatible with thermoplastic material employed in said article.

* * * * *